United States Patent
Kamata

[11] Patent Number: 5,805,938
[45] Date of Patent: Sep. 8, 1998

[54] LENS BARREL

[75] Inventor: Tetuji Kamata, Kawasaki, Japan

[73] Assignee: Nikon Corporation, Tokyo, Japan

[21] Appl. No.: 919,617

[22] Filed: Aug. 28, 1997

[30] Foreign Application Priority Data

Jan. 14, 1997 [JP] Japan ................................. 9-004224

[51] Int. Cl.$^6$ ............................. G03B 17/00; G02B 15/14
[52] U.S. Cl. ............................................ 396/72; 359/700
[58] Field of Search ............................. 396/72; 359/700, 359/701

[56] References Cited

U.S. PATENT DOCUMENTS 5,579,173  11/1996  Hamasaki et al. ..................... 359/700
5,731,913   3/1998  Imanari ................................. 359/700
5,739,967   4/1998  Tanaka .............................. 359/700 X Primary Examiner—W. B. Perkey
Attorney, Agent, or Firm—Morgan, Lewis & Bockius LLP

[57] ABSTRACT

A lens barrel and a cam barrel are disclosed, in which a cam barrel is miniaturized and a molding ability is improved while maintaining the strength of the cam barrel. An outer peripheral side cam groove having a bottom part which does not penetrate a zooming cam barrel is formed in the outer peripheral part of the zooming cam barrel. An inner peripheral side cam groove having a bottom part which does not penetrate the zooming cam barrel is formed in the inner peripheral part of the zooming cam barrel. The outer and inner peripheral side cam grooves are arranged so as to be prevented from overlapping each other in the radial direction of the zooming cam barrel. The total depth of the outer and inner peripheral side cam grooves is set larger than the thickness t of the zooming cam barrel.

15 Claims, 3 Drawing Sheets

LENS BARREL

This application claims the benefit of Japanese Application No. 9-4224, which is hereby incorporated by reference.

BACKGROUND OF THE INVENTION

1. Field of the Invention

The present invention relates to a lens barrel constructed in such a manner that a lens group constituting the photographic optical system of a cam barrel including a cam ring and so on is moved by a specified amount.

2. Description of the Related Art

The lens barrel of this type has conventionally included a fixed barrel, a focusing operation ring provided in this fixed barrel so as to be freely rotated and operated for focusing, a zoom operation ring provided in this fixed barrel so as to be freely rotated and operated for zooming, a lens frame for holding a lens group and moving along the inner peripheral part of the fixed barrel in the direction of an optical axis and a cam barrel provided in the fixed barrel so as to be freely rotated for imparting a driving force used to move the lens group in the direction of an optical axis. A cam groove was formed in the cam barrel so as to penetrate the same and a pin which is provided in the lens frame was fitted into this cam groove so as to be freely moved. In the lens barrel having such a structure, the cam barrel was rotated associatively with the rotation of the focusing operation ring and/or the zooming operation ring and by imparting a driving force to the pin fitted in the cam groove, the lens frame was moved in the direction of an optical axis.

In the conventional lens barrel, cam grooves equal in number to the number of lens frames were formed in the cam barrel in order to move a plurality of lens frames by one cam barrel. It was necessary to widen intervals among the cam grooves to a certain degree in order to secure a sufficient strength for the cam barrel. However, if the intervals were widened among the cam grooves, the length of the cam barrel in the direction of an optical axis was made longer. Consequently, it was impossible to reduce the size of the entire lens barrel. In order to solve such a problem, a method for shortening the length of the cam barrel in the direction of an optical axis by forming a plurality of cam grooves having bottom parts, which do not penetrate the cam barrel, in the inner and outer peripheral surfaces of the cylindrical cam barrel, and securing degree of permissibility for arranging the cam grooves in the cam barrel, may be considered. However, in the lens barrel having such a structure, a strength for the cam barrel needs to be secured by arranging the cam grooves having bottom parts formed in the inner and outer peripheral part sides so as not to overlap one another (not to interfere with one another) in the radial direction of the cam barrel. Consequently, since the thickness of the cam barrel is made larger than the total depth of the cam grooves having bottom parts formed in the inner and outer peripheral part sides, the length of the cam barrel in a diameter direction is made longer and the lens barrel cannot be miniaturized or reduced in weight.

Furthermore, in the lens barrel having the above-noted structure, a thin part in which the thickness of the cam barrel is smaller than those of the other portions is formed in a portion in which the cam grooves having bottoms formed in the inner and outer peripheral part sides overlap each other. Accordingly, when a cam barrel having such a structure is to be molded, there is a possibility that in a thin portion in which the thickness of the cam barrel changes, a molding failure caused by irregular deformation due to contraction, and so on, will occur and a molding ability will not be improved.

On the other hand, by setting the total depth of the cam grooves having bottom parts formed in the inner and outer peripheral part sides larger than the thickness of the cam barrel, the length of the cam barrel in the diameter direction can be shortened. However, in the cam barrel having this structure, a hole may be formed in a portion in which the cam grooves having bottom parts formed in the inner and outer peripheral part sides overlap each other and there is the possibility that lack of an intensity of the cam barrel is brought about.

SUMMARY OF THE INVENTION

The object of the present invention is to provide a lens barrel and a cam barrel, wherein the cam barrel can be miniaturized and a molding ability can be improved while maintaining the strength of the cam barrel.

According to an aspect of the present invention, in a lens barrel for moving at least one part of a photographic optical system in the direction of an optical axis by a cam barrel, the cam barrel includes an outer peripheral side cam groove having a bottom part formed in its outer peripheral part so as not to penetrate the cam barrel and an inner peripheral side cam groove having a bottom part formed in its inner peripheral part so as not to penetrate the cam barrel, the outer and inner peripheral side cam grooves are formed in such a manner that at least portions of the grooves do not overlap each other in the radial direction of the cam barrel, and the total depth of the outer and inner peripheral side cam grooves is larger or equal to the thickness of the cam barrel.

According to another aspect of the present invention, in a lens barrel for moving at least one part of a photographic optical system in the direction of an optical axis by a cam barrel, the cam barrel includes an outer peripheral side cam groove having a bottom part formed in its outer peripheral part so as not to penetrate the cam barrel and an inner peripheral side cam groove having a bottom part formed in its inner peripheral part so as not to penetrate the cam barrel, the outer and inner peripheral side cam grooves are formed in such a manner that at least portions the grooves do not overlap each other in the radial direction of the cam barrel, and the bottom part of the outer peripheral side cam groove is formed in the inner peripheral part more than the bottom of the inner peripheral side cam groove is.

According to still another aspect of the present invention, in a lens barrel for moving at least one part of a photographic optical system in the direction of an optical axis by a cam barrel, the cam barrel includes an outer peripheral side cam groove having a bottom part formed in its outer peripheral part so as not to penetrate the cam barrel and an inner peripheral side cam groove having a bottom part formed in its inner peripheral part so as not to penetrate the cam barrel, the outer and inner peripheral side cam grooves are formed in such a manner that at least portions of the grooves do not overlap each other in the radial direction of the cam barrel, and the length of the cam barrel from a rotational axis line to the bottom part of the outer peripheral side groove is equal to or shorter than its length from the rotational axis line to the bottom part of the inner peripheral side cam groove.

In the lens barrel of the present invention, the outer and inner peripheral side cam grooves may be formed alternately in the peripheral direction of the cam barrel.

According to still another aspect of the present invention, there is provided a cam barrel for moving at least one portion of a photographic optical system in the direction of an optical axis, comprising an outer peripheral side cam grooves having a bottom part formed so as not to penetrate the cam barrel and an inner peripheral side cam groove having a bottom part formed so as not to penetrate the cam barrel, wherein the outer and inner peripheral side cam grooves are formed in such a manner that at least portions of the grooves do not overlap each other in a radial direction and the total depth of the outer and inner peripheral side cam grooves is larger or equal to the thickness of the cam barrel in the radial direction.

According to still another further aspect of the present invention, there is provided a cam barrel for moving at least one portion of a photographic optical system in the direction of an optical axis, comprising an outer peripheral side cam groove having a bottom part formed so as not to penetrate the cam barrel and an inner peripheral side cam groove having a bottom part formed so as not to penetrate the cam barrel, wherein the outer and inner peripheral side cam grooves are formed in such a manner that at least portions of the grooves do not overlap each other in a radial direction and the bottom part of the outer peripheral side cam groove is formed in the inner peripheral part more than the bottom part of the inner peripheral side cam groove is.

According to still another aspect of the present invention, there is provided a cam barrel for moving at least one portion of a photographic optical system in the direction of an optical axis, comprising an outer peripheral side cam groove having a bottom part formed so as not to penetrate the cam barrel and an inner peripheral side cam groove having a bottom part formed so as not to penetrate the cam barrel, wherein the outer and inner peripheral side cam grooves are formed in such a manner that at least portions of the grooves do not overlap each other in a radial direction and the length of the cam barrel from a rotational axis line to the bottom part of the outer peripheral side cam groove is equal to or shorter than the length of the cam barrel from the rotational axis line to the bottom part of the inner peripheral side cam groove.

In the cam barrel of the present invention, the outer and inner peripheral side cam grooves may be formed alternately in a peripheral direction.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

The first embodiment of the present invention will be described more in detail below with reference to the accompanying drawings.

Figure 1:
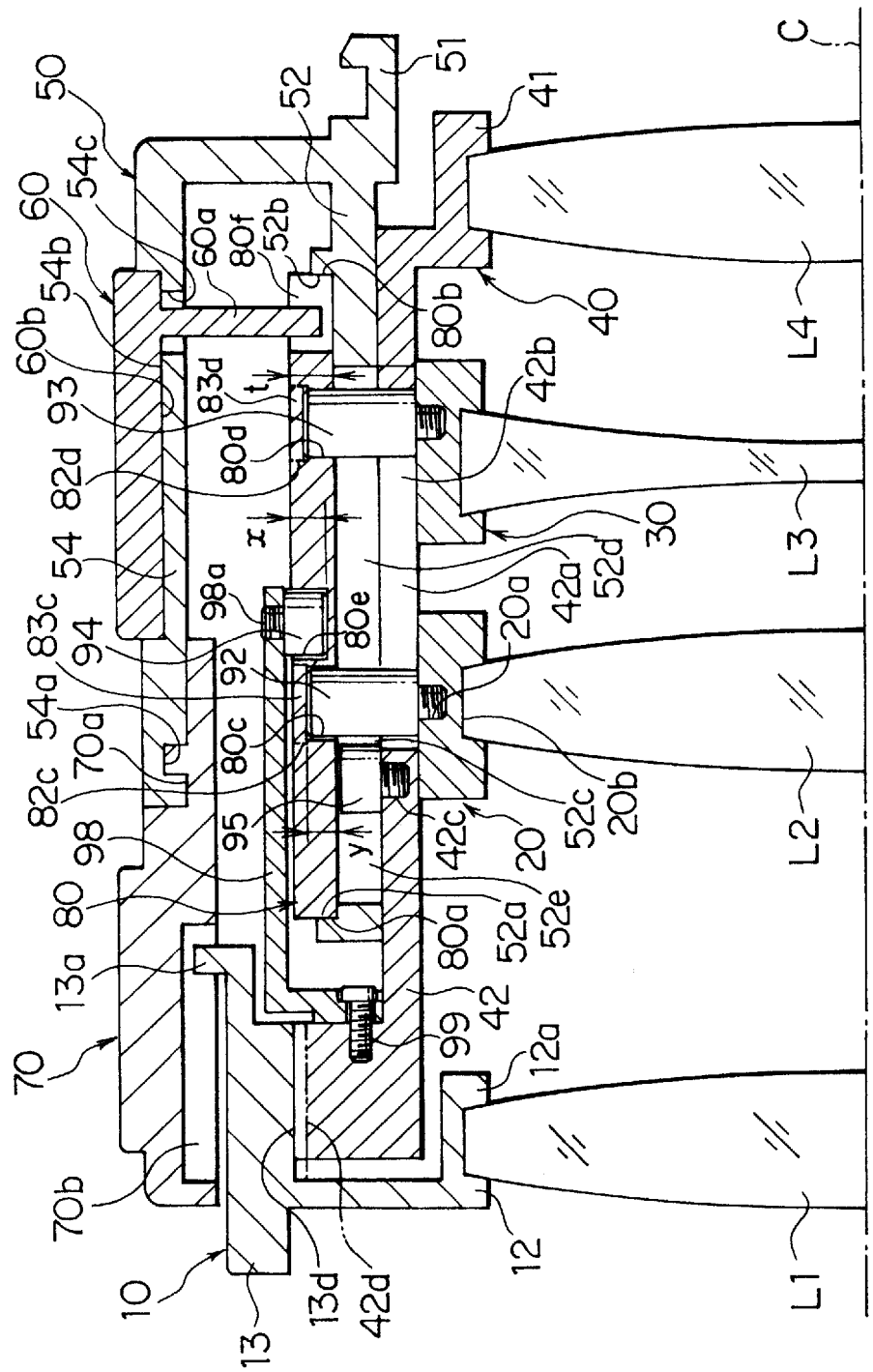
FIG. 1 is a section view of a lens barrel of a first embodiment of the present invention.
Figure 2:
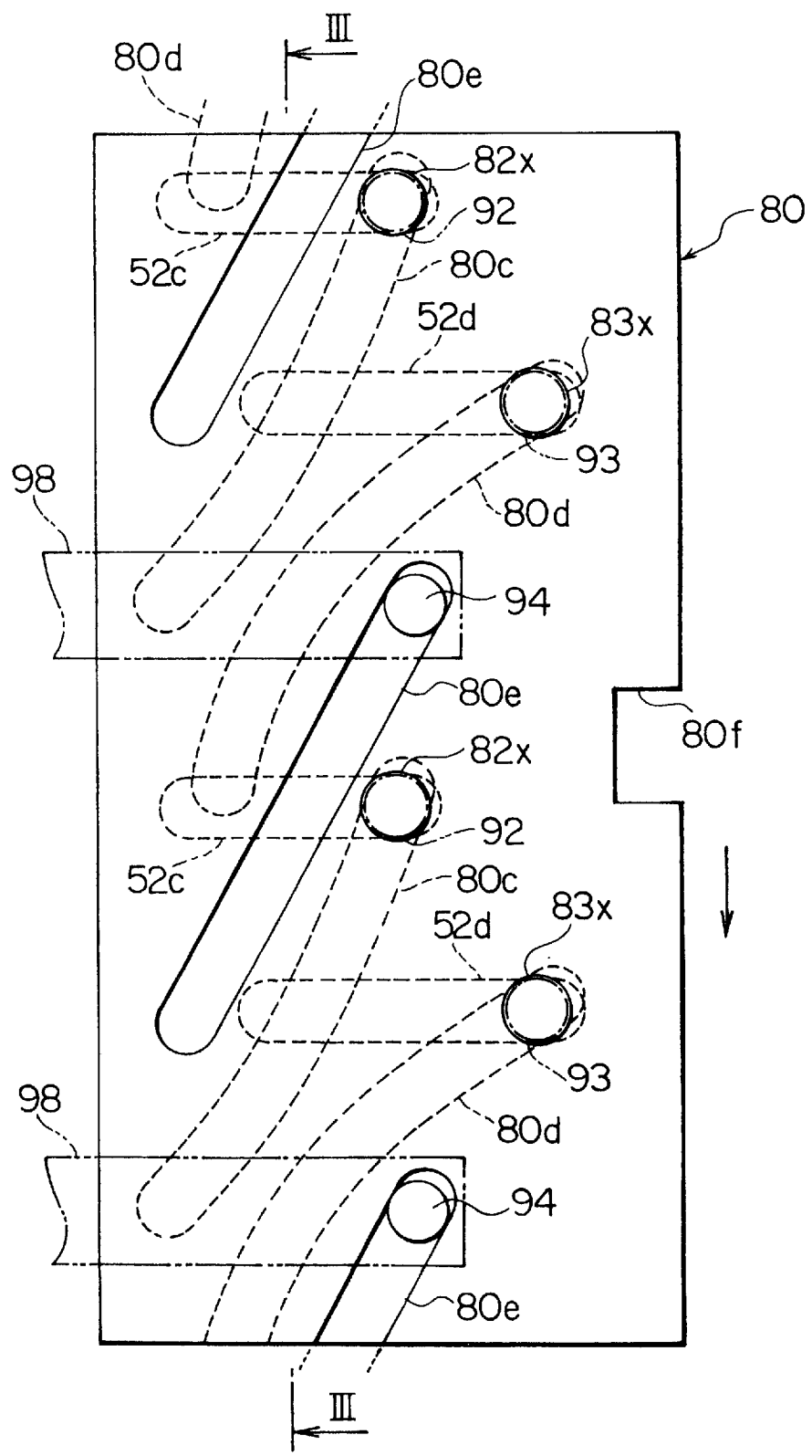
FIG. 2 is a development showing a state where a zooming cam barrel provided in the lens barrel of the first embodiment of the present invention is developed within a range of 360 degrees.
Figure 3:
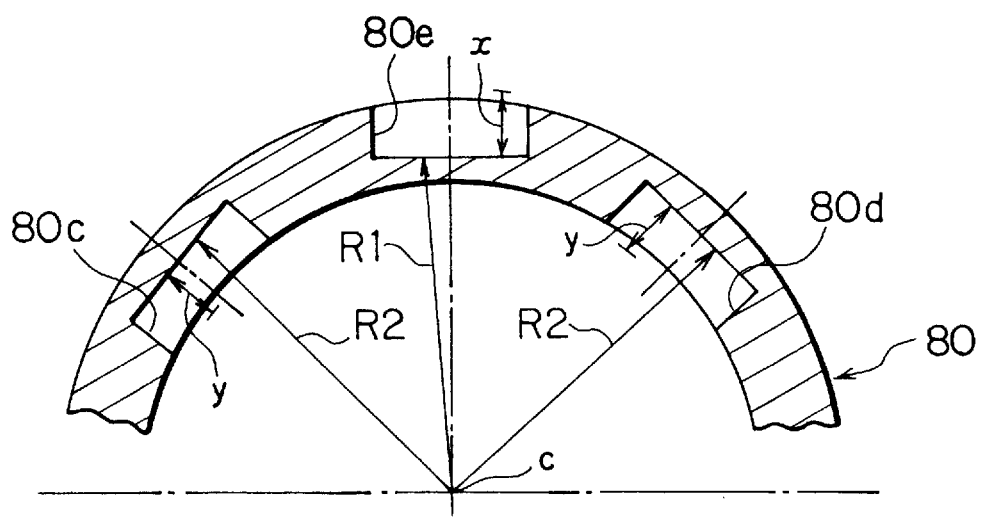
FIG. 3 is a section view showing the zooming cam barrel of FIG. 1, being taken along a line III—III of FIG. 2.

FIG. 1 is a section view showing the lens barrel of the first embodiment of the present invention. FIG. 2 is a development showing a state where the zooming cam barrel of the lens barrel of the first embodiment of the present invention is developed within the range of 360 degrees. FIG. 3 is a section view showing the zooming cam barrel of FIG. 1, which is taken along the line III—III of FIG. 2. In FIG. 2, pins 92, 93 and 94, guide pins 95, cam grooves 80c, 80d and 80e and zooming straight advance grooves 52c, 52d and 52e are provided, amounting to two pieces respectively, in symmetrical positions by 180 degrees. In FIG. 1, only one piece for each is shown while illustrations for another piece for each are omitted.

The lens barrel of the embodiment of the present invention includes first, second, third and fourth lens groups L1, L2, L3 and L4 arranged on the same optical axis C, lens frames 10, 20, 30 and 40 for respectively supporting these lens groups, a fixed barrel 50 composed of an inner barrel part 52 and an outer barrel part 54 formed in the outer peripheral side of the inner barrel part 52, a zooming cam barrel 80 arranged between the inner barrel part 52 and the outer barrel part 54 and supported so as to be freely rotated in the outer peripheral part of the inner barrel part 52, a zooming operation ring 60 for rotating the zooming cam barrel 80, a focusing operation ring 70 for driving the lens frame 10, and so on. In the fixed barrel 50, a mount part 51 is formed in its rear end part, the mounting part 51 serving to engage the lens barrel with the mount part of a camera body (not shown) detachably.

The outer barrel part 54 is a cylindrical portion for supporting the focusing and zooming operation rings 70 and 60, later described, so as to rotate the same around the optical axis C. The outer barrel part 54 has in its inner peripheral part an engaging part 54a formed in a subject side for attaching the focusing operation ring 70 rotatively. In its outer peripheral part, the outer barrel part 54 has an engaging part 54b formed in the mount part 51 side for attaching the zooming operation ring 60 rotatively and a peripheral relief groove 54c formed within a specified range in the circumferential direction of the engaging part 54b penetrating the mount part 51 side of the engaging part 54b so as to enable the zooming operation ring 60 to be rotated. The end part of the mount part 51 side of the outer barrel part 54 is connected to a flange part formed in the outer peripheral part of the inner barrel part 52.

The focusing operation ring 70 is a member operated when focusing for forming the image of a subject on an image forming surface (not shown) is performed. In the outer peripheral part of the focusing operation ring 70, an engaging part 70a is formed, which engages with the engaging part 54a of the outer barrel part 54 so as to freely slide. In the inner peripheral part of the focusing operation ring 70, a straight advance groove 70b for focusing is formed to have a specified length in parallel with the optical axis C, the groove 70b being engaged with a connection projecting part 13a later described.

The zooming operation ring 60 is a member operated when photographing is performed by continuously changing a focal length. In the inner peripheral part of the zooming operation ring 60, an engaging part 60b is formed to be engaged freely slidably with the engaging part 54b of the outer barrel part 54 and a connection projecting part 60a is formed, which projects from the inner peripheral part, penetrates the peripheral relief groove 54c and engages with the notched part 80f of the zooming cam barrel 80.

The inner peripheral portion 52 is a cylindrical portion for supporting the zooming cam barrel 80, later described, so as to freely rotate the same around the optical axis C, and holding the lens barrel 40, later described, in the direction of the optical axis C, so as to allow the same to be freely moved. As shown in FIGS. 1 and 2, the inner barrel part 52 has zooming straight advance grooves 52c, 52d and 52e for guiding the pins 92 and 93 and the guide pin 95, later described, which are formed in parallel with the optical axis C so as to penetrate the inner barrel part 52. As shown in FIG. 1, in its outer peripheral part of the inner barrel part 52, engaging parts 52a and 52b for rotativebly supporting the zooming cam barrel 80 are formed. In its inner peripheral part, the inner barrel part 52 has the straight body cylindrical part 42 of the lens frame 40, later described, supported so as to be freely moved in the direction of the optical axis C.

The zooming cam barrel 80 is a member for imparting driving forces, which are used to drive the pins 92, 93 and 94, later described, along the zooming straight advance grooves 52c, 52d and 52e. As shown in FIG. 2, the zooming cam barrel 80 has a notched part 80f formed in the end part of its mount part 51 side. In addition, as shown in FIG. 1, the zooming cam barrel 80 has engaging parts 80a and 80b engaged with the engaging parts 52a and 52b of the inner barrel part 52 so as to be freely slid and pin inserting holes 82c and 82d, later described. As shown in FIGS. 1 and 2, in its outer peripheral part, the zooming cam barrel 80 has a straight cam groove 80e formed around the optical axis C in a spiral shape, in which the tip part of the pin 94 is fitted. In its inner peripheral part, the zooming cam barrel 80 has curved cam grooves 80c and 80d formed around the optical axis C in spiral shapes, in which the tip parts of the pins 92 and 93 are respectively fitted.

The cam groove 80e is a cam groove having a bottom part, which forms an opening part in the outer peripheral part side of the zooming cam barrel 80 and does not penetrate the zooming cam barrel 80. As shown in FIG. 1, the depth of this cam groove 80e is x.

The cam grooves 80c and 80d are recessed cam grooves having bottom parts, each of which forms an opening part in the inner peripheral part side of the zooming cam barrel 80. As shown in FIG. 1, the depth of each of the cam grooves 80c and 80d is y. In the first embodiment of the present invention, the sum (x+y) of the depth x of the cam groove 80e and the depth of each of the cam grooves 80c and 80d is set larger than the thickness t of the zooming cam barrel 80 in the optical axis C and a vertical direction (radial direction). As shown in FIG. 3, a radius R1 passing through the bottom part of the cam groove 80e around the optical axis (rotational axis line of the zooming cam barrel 80) is set smaller than a radius R2 passing through the bottom part of each of the cam grooves 80c and 80d around the optical axis C. Consequently, as shown in FIGS. 1 and 3, the bottom part of the cam groove 80e is formed in the inner peripheral part side of the zooming cam barrel 80 more than the bottom parts of the cam grooves 80c and 80d are. As shown in FIG. 3, the cam grooves 80c, 80d and 80e are alternately formed in the order of the cam groove 80c, the cam groove 80e and the cam groove 80d in the circumferential direction of the zooming cam barrel 80. Accordingly, as shown in FIG. 2, the cam grooves 80c, 80d and 80e are arranged in such a manner that portions of the grooves do not overlap one another in the radial direction of the zooming cam barrel 80.

The pin inserting holes 82c and 82d are holes for attaching the pins 92 and 93 from the outer peripheral part side of the zooming cam barrel 80 to the lens frames 20 and 30 when the lens barrel is to be assembled. As shown in FIG. 2, the pin inserting holes 82c and 82d are formed so as to penetrate the zooming cam barrel 80 from the bottom parts of the cam grooves 80c and 80d to the outer peripheral part of the zooming cam barrel 80 in one end part of each of the cam grooves 80c and 80d. The pin inserting holes 82c and 82d may be kept open even after completion of assembling the lens barrel. But these holes may be closed by hole plugs 83c and 83d after attaching of the pins 92 and 93 to the lens frames 20 and 30.

A connecting member 98 is a plate-like member for supporting the pin 94, later described, and connecting this pin 94 to the lens frame 40. The connecting member 98 has a pin attaching part 98a for attaching the pin 94, which is formed in the surface of its side opposite the outer peripheral part of the zooming cam barrel 80. The connecting member 98 is extended to the end surface of the mount part 51 side of a male helicoid screw part 42d formed in the lens frame 40 and fixed to the same by a screw 99. Two such connecting members 98 are arranged in the outer peripheral part side of the zooming cam barrel 80 in order to support two pins 94 formed in the symmetrical positions by 180 degrees of the zooming cam barrel 80 and fitted in the cam groove 80e.

The lens frame 40 is a member for supporting the fourth lens group L4 and the lens frames 20 and 30, later described, so as to allow these frames to be freely moved in the direction of the optical axis C. The lens frame 40 has a lens attaching part 41 formed in its mount part 51 side for attaching the fourth lens group L4 and a straight body cylindrical part 42 extended from a part close to the end part of the mount part 51 side of the zooming cam barrel 80 to the subject side end part of the inner barrel part 52 in parallel with the optical axis C. The straight body cylindrical part 42 has relief grooves 42a and 42b formed in parallel with the optical axis C, in which the pins 92 and 93, later described, are fitted. In its outer peripheral part, the straight body cylindrical part 42 has a pin attaching part 42c for attaching the pin 92, later described, and a male helicoid screw part 42d formed in the subject side and engaged with the female helicoid screw part 10d of the lens frame 10, later described. In its inner peripheral part, the straight body cylindrical part 42 supports the lens frames 20 and 30, later described, so as to allow these frames to be freely moved in the direction of the optical axis.

The lens frame 10 is a frame for supporting the first lens group L1. The lens frame 10 is composed of an outer barrel part 13, which is arranged between the outer peripheral part of the male helicoid screw part 42d formed in the straight body cylindrical part 42 and the inner peripheral part of the focusing operation ring 70, and an inner barrel part 12 which is protruded from the inner peripheral part of this outer barrel part 13 and arranged in the inner peripheral part side of the straight body cylindrical part 42. The outer barrel part 13 has a connection projecting part 13a formed in its outer peripheral part and a female helicoid screw part 13d formed in its inner peripheral part. The inner barrel part 12 has a lens attaching part 12a for supporting the first lens group L1 in its inner peripheral part.

The lens frames 20 and 30 are members for respectively supporting the second and third lens groups L2 and L3. The lens frames 20 and 30 have the same structures, although these frames support the different lens groups. The description below will be made by focusing on the lens frame 20 and the pin 92. The lens frame 20 has a pin attaching part 20a for attaching the pin 92, later described, which is formed in its outer peripheral part. The lens frame 20 also has a lens attaching part 20b for attaching the second lens group L2, which is formed in its inner peripheral part.

The pins 92 and 93 are respectively moved along the zooming straight advance grooves 52c and 52d and the cam grooves 80c and 80d so as to move the lens frames 20 and 30 in the direction of the optical axis C. The end part of the pin 92 which comes close to the optical axis C is attached to the pin attaching part 20a of the lens frame 20 and the pin 92 is protruded from the outer peripheral surface of the lens 20 in a direction perpendicular to the optical axis C. The end part of the pin 92 which moves away from the optical axis C is passed through the relief groove 42a and the zooming straight advance groove 52c and fitted in the cam groove 80c so as to be freely moved.

The pin 94 is moved along the cam groove 80e so as to moved the lens frame 40 in the direction of the optical axis C. The end part of the pin 94 which moves away from the optical axis C is attached to the lens attaching part 98a of the connecting member 98. The end part of the pin 94 which comes close to the optical axis C is fitted in the cam groove 80e of the zooming cam barrel 80.

The guide pin 95 is moved along the zooming straight advance groove 52e so as to guide the lens frame 40 in the direction of the optical axis C. The end part of the guide pin 95 which comes close to the optical axis C is attached to the pin attaching part 42c of the straight body cylindrical part 42. The end part of the guide pin 95 which moves away from the optical axis C is fitted in the zooming straight advance groove 52e of the inner barrel part 52 so as to be freely moved.

Next, the operation of the lens barrel of the first embodiment of the present invention will be described by dividing the operation into zooming and focusing operations.

(Zooming Operation)

After a photographer rotates the zooming operation ring 60, the connection projecting part 60a protruded from the zooming operation ring 60 pushes the notched part 80f of the zooming cam barrel 80 in an arrow direction shown in FIG. 2. The zooming cam barrel 80 is then rotated around the optical axis C. After the zooming cam barrel 80 has been rotated, the pins 92, 93 and 94 are moved in contact with the side faces of the cam grooves 80c, 80d and 80e in which the pins are fitted and then pushed by these side faces.

The pins 92, 93 and 94 receive driving forces in the contact parts with the cam grooves 80c, 80d and 80e. The lens frames 20 and 30 are made to rotate around the optical axis C associatively with the pins 92 and 93 respectively. The lens frame 40 receives a driving force from the pin 94 through the connecting member 98 and made to rotate around the optical axis C. The pins 92 and 93 are respectively fitted in the zooming straight advance grooves 52c and 52d. The guide pin 95 provided in the lens frame 40 is fitted in the zooming straight advance groove 52e. Accordingly, the lens frames 20, 30 and 40 are regulated for rotation around the optical axis C. Consequently, the lens frames 20 and 30 are moved in the inner peripheral part of the lens frame 40 in parallel with the optical axis C while being guided by the zooming straight advance grooves 52c and 52d. The lens frame 40 is moved in the inner peripheral part of the inner barrel part 52 in parallel with the optical axis C while being guided by the zooming straight advance groove 52e. The lens frame 10 is connected to the lens frame 40 by its male helicoid screw part 42d which is engaged with the female helicoid screw part 13d. Accordingly, when the lens frame 40 is moved, the lens frame 10 is associatively with the lens frame 40 in a direction which is in parallel with the optical axis C while being guided by the focusing straight advance groove 70b engaged with the connection projecting part 13a.

It can be understood from the foregoing that a zooming operation is performed by the movements of the first, second, third and fourth lens groups L1, L2, L3 and L4 in the direction of the optical axis C. In addition, adjustment of a focal length can be performed by adjusting the rotational direction and angle of the zooming operation ring 60.

(Focusing Operation)

After the photographer rotates the focusing operation ring 70, the side face of the focusing straight advance groove 70b along the longitudinal direction pushes the connection projecting part 13a and the lens frame 10 is made to rotate around the optical axis C. The lens frame 10 is connected to the lens frame 40 by the male helicoid screw part 42d and the female helicoid screw part 13d. But the pin 95 provided in the lens frame 40 permits only a movement along the zooming straight advance groove 52e. Accordingly, the lens frame 40 cannot be rotated around the optical axis C. The lens frame 10 is moved, being rotated around the optical axis C, while the female helicoid screw part 13d is engaged with the male helicoid screw part 42d of the lens frame 40.

It can be understood from the foregoing that a focusing operation is performed by the movement of the first lens group L1 in the direction of the optical axis C. In addition, adjustment of a focal length can be performed by adjusting the rotational direction and angle of the focusing operation ring 70.

According to the first embodiment of the present invention, as shown in FIG. 3, the sum (x+y) of the groove depth x of the cam groove 80e and the groove depth y of each of the cam grooves 80c and 80d is set larger than the thickness t of the cam barrel 80 and the cam grooves 80c, 80d and 80e are arranged alternately in the circumferential direction of the zooming cam barrel 80. Consequently, overlapping (interference) of full portions or portions between the cam grooves 80c and 80e can be prevented in the thrusting direction of the zooming cam barrel 80. Further, formation of a hole in the overlapped portion between these grooves and a reduction in the strength of the zooming cam barrel 80 can be prevented.

According to the first embodiment of the present invention, as shown in FIG. 3, the cam grooves 80c, 80d and 80e are arranged alternately in the circumferential direction of the zooming cam barrel 80 and the occurrence of a partial change in the thickness of the zooming cam barrel 80 is prevented. Consequently, in the zooming cam barrel 80, no portions in which changes occur in thickness are formed, like a thin portion held between the cam grooves 80c and 80e. Accordingly, it never happens that molding of the zooming cam barrel 80 is difficult because of a change in thickness or a molding failure is produced because of irregular deformation in a thin part. In addition, according to the first embodiment of the present invention, as shown in FIG. 3, since no thin parts held between the cam grooves 80e and 80d are formed, the length of the zooming cam barrel 80 in the diameter direction is shortened and the lens barrel can be miniaturized and reduced for weight.

According to the first embodiment of the present invention, the length of the zooming cam barrel 80 in the direction of the optical axis is also shortened in order to shorten the length of the lens barrel in the direction of the optical axis C. Because of the structural constraints of the lens barrel and the arrangement of the optical system, the fourth lens group L4 is positioned approximately under the mount part 51. Accordingly, a pin for moving the fourth lens group L4 cannot be protruded from the lens frame and fitted in the zooming cam barrel 80 by avoiding the mount part 51. In the first embodiment of the present invention, the cam groove 80e is formed in the outer peripheral part side of the zooming cam barrel 80 and the pin 94 is fitted in this cam groove 80e. The straight body cylindrical part 42 extended in the direction of the optical axis C is formed in the lens frame 40, and this straight body cylindrical part 42 and the pin 94 are connected to each other by the connecting member 98. Consequently, by securing a sufficient contact area between the straight body cylindrical part 42 and the inner side fixed barrel 52, the fourth lens group L4 is prevented from falling in the optical axis C. According to the first embodiment of the present invention, even in the lens barrel having the above-noted structure, since the lengths of the zooming cam barrel 80 in the direction of the optical axis C and the diameter direction can be shortened, the lens barrel can be miniaturized and reduced for weight.

According to another embodiment of the present invention, the sum (x+y) of the groove depth x of the cam groove 80e and the groove depth y of each of the cam grooves 80c and 80d is set equal to the thickness of the cam barrel 80. According to yet another embodiment of the present invention, a radius R1 passing through the bottom part of the cam groove 80e around the optical axis C is set equal to a radius R2 which is passed through the bottom parts of the cam grooves 80c and 80d around the optical axis C. In these cases, by arranging the cam grooves 80c, 80d and 80e alternately in the zooming cam barrel 80, full portions or portions of the cam grooves 80c, 80d and 80e can be prevented from overlapping one another in the thrusting direction of the zooming cam barrel 80.

The present invention is not limited to the foregoing embodiments. According to the technical teachings of the invention, various changes and modifications can be made within the scope of the invention.

In the embodiment of the present invention, the cam grooves 80c, 80d and 80e are formed, two for each, in the symmetrical positions by 180 degrees in the outer and inner peripheral parts of the zooming cam barrel 80, and the pins 92, 93 and 94 are fitted, one for each, in the cam grooves 80c, 80d and 80e which are formed in two spots respectively. However, the numbers of cam grooves and pins are not limited to the numbers described in the embodiment of the present invention. Even if the cam grooves 5a, 5b and 5c are used for not only a zooming operation as in the case of the embodiment of the present invention but also for a focusing operation, focusing and zooming operations and other operations, the same effect can be obtained. Further, the member for moving the lens frame 40 is divided into two sections, that is, the section of the cam groove 80e and the pin 94 fitted in this groove 80e and the section of the zooming straight advance member 52e and the guide pin 95 fitted in this groove 52e. The member for moving the lens frames 20 and 30 may also be divided into such two sections.

As described above in detail, according to the present invention, the outer peripheral side cam groove having a bottom part is formed in the outer peripheral part of the cam barrel so as not to penetrate this cam barrel, the inner peripheral side cam groove having a bottom part is formed in the inner peripheral part of the cam barrel so as not to penetrate this cam barrel, these grooves are formed in such a manner that at least portions of the grooves do not overlap each other, and the total depth of the outer and inner peripheral side cam grooves is set larger than or equal to the thickness of the cam barrel. According to the present invention, the bottom part of the outer peripheral side cam groove is formed in the inner peripheral part side more than the bottom part of the inner peripheral side cam groove is. According to the present invention, the length of the cam barrel from the rotational axis line to the bottom part of the outer peripheral side cam groove is equal to or shorter than its length from the rotational axis line to the bottom part of the inner peripheral side cam groove. Accordingly, the length of the cam barrel in the diameter direction cam be shortened while securing a strength for the cam barrel and the lens barrel can be miniaturized and reduced for weight.

According to the present invention, since the outer and inner peripheral side cam grooves are formed alternately in the peripheral direction of the cam barrel, no portions in which changes occur in thickness are formed in the cam barrel and molding of the cam barrel is facilitated. Also, the occurrence of a molding failure in the cam barrel and the shortage of strength can be prevented.

According to the present invention, the outer peripheral side cam groove having a bottom part which does not penetrate the cam barrel and the inner peripheral side cam groove having a bottom part which does not penetrate the cam barrel are formed in such a manner that at least portions of the grooves do not overlap each other in the radial direction and the total depth of the outer and inner peripheral side cam grooves is set larger than or equal to the thickness of the cam barrel in the radial direction. According to the present invention, the bottom part of the outer peripheral side cam groove is formed in the inner peripheral side more than the bottom part of the inner peripheral side cam groove is. According to the present invention, the length of the cam barrel from the rotational axis line to the bottom part of the outer peripheral side cam groove is set equal or shorter than its length from the rotational axis line to the bottom part of the inner peripheral side cam groove. Accordingly, the length of the cam barrel in the diameter direction can be shortened while securing a strength for the cam barrel and the cam barrel can be miniaturized and reduced for weight.

Furthermore, according to the present invention, since the outer and inner peripheral side cam grooves are formed alternately in the peripheral direction, no portions in which changes occur in thickness are formed in the cam barrel, molding of the cam barrel is facilitated and the occurrence of a molding failure in the cam barrel and the shortage of strength can be prevented.

Although the preferred embodiments of the present invention have been described in detail, it should be understood that various changes, substitutions and alternations can be made therein without departing from spirit and scope of the inventions as defined by the appended claims.

What is claimed is:

1. A lens barrel comprising:
   a photographic optical system;
   a plurality of holding members having cam pins for holding at least a portion of said photographic optical system; and
   a cam barrel having a plurality of cam grooves engaged with said cam pins, which is rotated for moving said holding members in a direction of an optical axis,
   wherein at least one of said cam grooves is an outer peripheral cam groove having a bottom part formed in an outer periphery of said cam barrel, the rest of said cam grooves are inner peripheral grooves having bottom parts formed in an inner periphery of said cam barrel, said outer and inner peripheral grooves are arranged so as to be prevented from overlapping one another in a radial direction of said cam barrel and a total depth of said outer and inner peripheral grooves is set larger than and alternatively equal to a thickness of said cam barrel.

2. A lens barrel according to claim 1, wherein said outer and inner peripheral grooves are formed alternately in a peripheral direction of said cam barrel.

3. A lens barrel according to claim 1, wherein each of said holding members having said cam pins engaged with said outer peripheral groove further includes a connecting member for connecting each of said cam pins and said holding member with each other in a radial direction outer side of said cam barrel.

4. A lens barrel comprising:

a photographic optical system;

a plurality of holding members having cam pins for holding at least a portion of said photographic optical system; and a cam barrel having a plurality of cam grooves engaged with said cam pins, which is rotated for moving said holding members in a direction of an optical axis;

wherein at least one of said cam grooves is an outer peripheral groove having a bottom part formed in an outer periphery of said cam barrel, the rest of said cam grooves are inner peripheral grooves having bottom parts formed in an inner periphery of said cam barrel, said outer and inner peripheral grooves are arranged so as to be prevented from overlapping one another in a radial direction of said cam barrel and said bottom part of said outer peripheral groove is positioned in an inner side of said radial direction more than said bottom part of each of said inner peripheral grooves is.

5. A lens barrel according to claim 4, wherein said outer and inner peripheral grooves are formed alternately in a peripheral direction of said cam barrel.

6. A lens barrel according to claim 4, wherein each of said holding members having said cam pins engaged with said outer peripheral groove further includes a connecting member for connecting each of said cam pins and said holding member with each other in a radial direction outer side of said cam barrel.

7. A lens barrel comprising:

a photographic optical system;

a plurality of holding members having cam pins for holding at least a portion of said photographic optical system; and a cam barrel having a plurality of cam grooves engaged with said cam pins, which is rotated for moving said holding members in a direction of an optical axis;

wherein at least one of said cam grooves is an outer peripheral groove having a bottom part formed in an outer periphery of said cam barrel, the rest of said cam grooves are inner peripheral grooves having bottom parts formed in an inner periphery of said cam barrel, said outer and inner peripheral grooves are arranged so as to be prevented from overlapping one another in a radial direction of said cam barrel and a distance of said cam barrel from a rotation axis line to said bottom part of said outer peripheral groove is smaller than and alternatively equal to a distance of said cam barrel from said rotational axis line to said bottom part of each of said inner peripheral groove.

8. A lens barrel according to claim 7, wherein said outer and inner peripheral grooves are formed alternately in a peripheral direction of said cam barrel.

9. A lens barrel according to claim 7, wherein each of said holding members having said cam pins engaged with said outer peripheral groove further includes a connecting member for connecting each of said cam pins and said holding member with each other in a radial direction outer side of said cam barrel.

10. A cam barrel for moving first and second holding frames for holding a photographic optical system in a direction of an optical axis, comprising:

a cylindrical main body;

an outer peripheral groove formed to have a bottom part in an outer periphery of said main body and engaged with a pin provided in said first holding frame; and an inner peripheral groove formed to have a bottom part in an inner periphery of said main body and engaged with a pin provided in said second holding frame, wherein said outer and inner peripheral grooves are arranged so as to be prevented from overlapping each other in a radial direction of said main body and a total depth of said outer and inner peripheral grooves is larger than and alternatively equal to a thickness of said main body.

11. A cam barrel according to claim 10, wherein said outer and inner peripheral grooves are formed alternately in a peripheral direction of said main body.

12. A cam barrel for moving first and second holding frames for holding a photographic optical system in a direction of an optical axis, comprising:

a cylindrical main body;

an outer peripheral groove formed to have a bottom part in an outer periphery of said main body and engaged with a pin provided in said first holding frame; and an inner peripheral groove formed to have a bottom part in an inner periphery of said main body and engaged with a pin provided in said second holding frame, wherein said outer and inner peripheral grooves are arranged so as to be prevented from overlapping each other in a radial direction of said main body and said bottom part of said outer peripheral groove is positioned in an inner side of said radial direction more than said bottom part of said inner peripheral groove is.

13. A cam barrel according to claim 12, wherein said outer and inner peripheral grooves are formed alternately in a peripheral direction of said main body.

14. A cam barrel for moving first and second holding frames for holding a photographic optical system in a direction of an optical axis, comprising:

a cylindrical main body;

an outer peripheral groove formed to have a bottom part in an outer periphery of said main body and engaged with a pin provided in said first holding frame; and an inner peripheral groove formed to have a bottom part in an inner periphery of said main body and engaged with a pin provided in said second holding frame, wherein said outer and inner peripheral grooves are arranged so as to be prevented from overlapping each other in a radial direction of said main body and a distance of said main body from a rotational axis line to said bottom part of said outer peripheral groove is smaller than and alternatively equal to a distance of said cam barrel from said rotational axis line to said bottom part of said inner peripheral groove.

15. A cam barrel according to claim 14, wherein said outer and inner peripheral grooves are formed alternately in a peripheral direction of said main body.

* * * * *